US008380648B2

(12) United States Patent
Matson et al.

(10) Patent No.: US 8,380,648 B2
(45) Date of Patent: Feb. 19, 2013

(54) ANALYTIC MODEL AND SYSTEMS FOR BUSINESS ACTIVITY MONITORING

(75) Inventors: Mark Matson, Hillsboro, OR (US); Randall L. Hughes, Centennial, CO (US); Xu Jiang, Shanghai (CN); Jun Cheng, Shanghai (CN)

(73) Assignee: Sybase, Inc., Dublin, CA (US)

( * ) Notice: Subject to any disclaimer, the term of this patent is extended or adjusted under 35 U.S.C. 154(b) by 1215 days.

(21) Appl. No.: 11/950,670

(22) Filed: Dec. 5, 2007

(65) Prior Publication Data

US 2009/0150319 A1      Jun. 11, 2009

(51) Int. Cl.
G06N 5/02    (2006.01)
G06N 5/04    (2006.01)
(52) U.S. Cl. ............................ 706/47; 700/778; 700/804
(58) Field of Classification Search ...................... 706/47
See application file for complete search history.

(56) References Cited

PUBLICATIONS

Sybase, "Sybase BAM 6.2 User Guide", Oct. 2007.*
Oracle, "Oracle9i Data Warehousing Guide Release 2 (9.2)" [online], Mar. 2002 [retrieved on Apr. 11, 2011]. Retrieved from the Internet: <URL:http://download.oracle.com/docs/cd/B10501_01/server.920/a96520.pdf>.*
Vasarhelyi et al., "Principles of Analytic Monitoring for Continuous Assurance", 2004 [retrieved on Apr. 11, 2011]. Retrieved from the Internet: <URL: http://raw.rutgers.edu/docs/research/M31.%020principles%20of%20analytic%20mont.pdf>.*
Motakis et al. (Motakis), Temporal Aggregation in Active Database Rules, 1997.*
Chakravarthy, et al. "Composite Events for Active Databases: Semantics, Context and Detection", Proceedings of the 20th VLDB Conference, 1994, pp. 606-617.
Motakis, et al. "Temporal Aggregation in Active Database Rules", ACM SIGMOD 1997, 12 pgs.
Sistla, et al. "Temporal Conditions and Integrity Constraints in Active Database Systems", Proc. of the 1995 ACM SIGMOD Intl. Conference on Management of Data, 1995, 14 pgs.
Tansel, et al. "Temporal Databases: Theory, Design, and Implementation", Benjamin-Cummings Pub Co. 1st Edition, 1993, Chapter 13, pp. 294-320.

* cited by examiner

*Primary Examiner* — Jeffrey A Gaffin
*Assistant Examiner* — Nathan Brown, Jr.
(74) *Attorney, Agent, or Firm* — Sterne, Kessler, Goldstein & Fox P.L.L.C.

(57) ABSTRACT

Methods, systems, and computer program products for monitoring, aggregating, and correlating business events in real time and acting on the results with near zero latency, wherein each event is processed in the first order relative to the event density, are described herein. In an embodiment, the method operates by receiving historical values comprising keys and data fields at an analytic model. Rules associated with actions are applied to the historical values. Actions including updating data are executed pursuant to the rules, and then the method determines whether additional rules are to be applied; and performs actions associated with these additional rules until there are no remaining rules to apply. The method stores updated data in a database.

26 Claims, 7 Drawing Sheets

ANALYTIC MODEL AND SYSTEMS FOR BUSINESS ACTIVITY MONITORING

BACKGROUND OF THE INVENTION

1. Field of the Invention

The present invention is generally directed to business intelligence systems, and more particularly directed to monitoring, aggregating, and correlating business events and acting on the results.

2. Background Art

Real time business intelligence is the process of delivering information about business operations without any latency.

Traditional business intelligence systems present historical information to users for analysis. Real time business intelligence compares current business events with historical patterns to detect problems or opportunities automatically. Organizations have been using business intelligence (BI) for many years to monitor, report on, analyze, and improve the performance of their business operations. Most BI applications to date have focused on managing strategic and tactical business plans and initiatives.

SYBASE™ BIZTRACKER™ is an example of a business activity monitoring solution that is currently available.

There are three main types of BI—strategic, tactical, and operational. Strategic BI is used for managing long-term business plans and goals. Executives and senior managers use the high-level business performance metrics (sometimes called key performance indicators, or KPIs) produced by strategic BI to track how well the business is doing against long-term business goals such as growing market share, reducing costs, and increasing revenues. As business initiatives such as marketing campaigns and new products are launched to help align actual business performance with planned performance, tactical BI analytics are employed by senior managers, business analysts, and line-of-business (LOB) managers to measure and optimize the performance of those initiatives. This tactical BI analyzes business operations over a period of days, weeks, or months.

To fully leverage the value of data, many companies use Business Intelligence (BI) solutions. Operational BI supports process optimization by pushing needed data to front-line analysts and managers in real time, supporting intra-day decisions. BI systems and solutions can dramatically improve efficiencies and decision-making across all facets of an enterprise.

To achieve operational BI, companies must overcome a number of challenges. They need a data warehousing and analytics solution that can extract real-time data from multiple sources on the fly. This solution also must transform the data into actionable business intelligence and make it accessible to those who need it. Also the solution must be able to handle huge volumes of data with many users making simultaneous complex ad hoc queries.

An example of an operational BI system is the SYBASE™ IQ™ product, which is an optimized analytics server designed to handle the challenges of operational BI. Operational BI is concerned with managing and optimizing daily business operations. It delivers the right information at the right time to the right business users to enable them to react rapidly to solve business problems and satisfy new business requirements. Fraud detection, risk management, customer segmentation, network management, and inventory management are examples of operational processes that can be improved using operational BI.

Operational BI improves the speed of reporting, analysis, and information delivery for faster operational decision-making and action-taking. The time for the business to react to operational issues or requirements is often called the action time. This action time may be a few seconds, minutes, or hours, depending on business needs. The action time requirement for fraud detection, for example, may be a few seconds, whereas intra-day inventory management may only require an action time of a few minutes or hours. Current operational BI systems are not real-time, because action times are based on what is right for any given business process, rather than on trying to reduce action as close to real-time as possible.

Business action time in operational BI processing has three components: data latency; reporting and analysis latency; and decision latency.

Data latency is the time it takes for the BI system to gather the data required for analyzing actionable operational events. Examples of events are the use of a credit card or ATM card, store purchase, manufacturing part request, stock trade, loan application, CSR request for customer data, database update, and so forth.

Reporting and Analysis latency is the time it takes for operational BI applications to report on and analyze the event data, and deliver the results to a business user or automated decision-making software for appropriate action.

Decision latency is the time it takes for the user, or decision-making software, to take action (if required) to solve a business issue or satisfy a business need identified by the original business event.

There are four main types of BI applications used to process and analyze actionable operational events and to help reduce data, analysis and decision latency: right-time data integration; operational BI reporting applications; decision automation software; and Decision automation software agents.

Right-time data integration applications collect and integrate information about actionable operational events for analysis. These events may originate from a variety of sources—for example, operational applications and databases, hardware devices (such as point-of-sale terminals or telecommunication switches), Web click streams, and so forth. The objective of right-time data integration is to reduce data latency.

Operational BI reporting applications produce reports about operational business transaction (BTx) data. In some applications these reports may be produced by accessing live operational data. In other cases, when a certain degree of data latency can be tolerated, the reports are produced using the information collected by right-time data integration applications. The objective of operational BI reporting is to reduce reporting latency.

Operational BI performance management (BI-PM) applications analyze the information collected by right-time data integration applications, produce business metrics about operational performance, and then deliver the results of the analyses to business users for decision-making and action-taking. The objective of operational BI-PM is to reduce analysis latency.

Decision automation software agents notify users about business issues and requirements that need urgent action. They also help business users evaluate BI-PM results and recommend actions that could help resolve business issues or satisfy business needs. In some cases, decision automation agents may take business action on behalf of business users. The objective of decision automation is to reduce decision latency.

What is needed are systems, methods, and computer program products that manage and optimize daily business operations by delivering information about business operations without any latency. What is further needed are real time business intelligence systems that compare current business events with historical patterns to automatically detect problems.

BRIEF SUMMARY OF THE INVENTION

The present invention includes system, method, and computer program product embodiments for modeling, monitoring, aggregating, and correlating business events in real time and acting on the results with near zero latency, wherein each event is processed in the first order relative to the event density. Methods and systems to model, monitor, aggregate and correlate business events in real time and act on the results with near zero latency while each event is processed relative to the event density are presented. The system, method, and computer program product embodiments disclosed herein perform near real-time business activity monitoring. In an embodiment, the invention operates by producing an analytic model, wherein the analytic model applies rules to business data and takes appropriate actions. In another embodiment of the present invention, business activities and data are aggregated and monitored in real-time. According to another embodiment of the invention, multiple analytic models are arranged or composed so that the output from one model provides input to another model. In this embodiment, a first analytic model feeds its output into a subsequent or downstream analytic model after the first model has processed rules and taken actions corresponding actions.

An embodiment of the present invention performs real-time business activity monitoring (BAM) by providing real-time access to critical business performance indicators. Unlike traditional real-time monitoring, the real-time BAM of the present invention draws information from multiple application systems and other internal and external sources, enabling a broader and richer view of business activities.

Further features and advantages of the present invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the embodiments of present invention and, together with the description, further serve to explain the principles of the invention and to enable a person skilled in the relevant art(s) to make and use the invention.

The features and advantages of the present invention will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION OF THE INVENTION

1. Overview of the Invention

The present invention is directed to systems, methods, and computer program products for monitoring, aggregating, and correlating business events in real time and acting on the results with near zero latency, wherein each event is processed in the first order relative to the event density. In an embodiment, the invention operates by producing an analytic model.

The analytic model represents a type of logical entity that has a state, intelligence, and behavior. The analytic meta-model defines the schema that applies to all analytic models. An instance of an analytic model is referred to as an analytic object.

2. Components of the Analytic Model

According to an embodiment, the basic components of an analytic model are fields, rules, timers, and actions. Fields define state, rules define intelligence, timers define event expiration, and actions define the activities performed by an analytic object when it detects a specified state. Behavior results from the interaction of state, intelligence, and actions. An analytic model associates rules and timers with actions such that action execution is governed by rule-based intelligence and timer expiration events.

2.1 Analytic Objects

According to an embodiment, an analytic object is uniquely identified by the values of its key fields. Many analytic objects may be instantiated from the same analytic model because an analytic object is implicitly created whenever a new set of key field values is presented. An analytic object is destroyed when its purge action executes.

An analytic model may be bound to a physical data store at which point it is referred to as a bound analytic model. Various qualities of service (data persistence, isolation level, transactionality) are implied through the choice of analytic model binding.

2.2 Fields

According to an embodiment, an analytic model represents its state as fields. Fields are conceptually similar to the member variables of a class. Each field in an analytic model has an associated data type. Field data types of embodiments of the present invention include, but are not limited to, those listed and described in Table 1.

TABLE 1

Supported Field Data Types

| Field Data Type | Data Type Description |
| --- | --- |
| String | Represents a string value. Size limits may be imposed by the binding. |
| Numeric | Represents a generic numeric value that can hold integer, double, and float values. |
| Boolean | Represents a Boolean value, True or False. |
| Calendar | Represents a date/time value. |
| Duration | Represents a period of time. In an embodiment of the invention, duration is a six-dimensional space where the coordinates designate the Gregorian year, day, hour, minute, and second. |
| Attachment | Represents an opaque blob of data. Attachment fields are opaque from the perspective of the model in which they are declared. In an embodiment of the invention, the analytic model may interrogate attachments within actions or "cast" attachments to stronger data types. |

In addition to a data type, each field in an analytic model also has one or more associated qualifiers. According to an embodiment of the invention, the analytic model supports the field qualifiers described in the table 2. Qualifiers of embodiments of the present invention include, but are not limited to, those listed and described in Table 2.

TABLE 2

Field Qualifiers

| Field Qualifier | Qualifier Description |
| --- | --- |
| Bound | A field that with the bound qualifier must be bound to a data store. The fact that a field carries the bound qualifier does not imply that the field is maintained in a persistent and/or transactional data store. A field that does not carry the bound qualifier is like a function parameter passed on the stack in that it doesn't retain its value from one analytic object invocation to the next. Only bound fields are available for viewing in the Monitor and Dashboard GUIs. |
| Key | The collection of fields that carry the key qualifier uniquely identify the analytic object in the data store. A field that carries the key qualifier must also carry the bound qualifier. |
| Aggregate | A field that carries the aggregate qualifier may have aggregate actions performed on it. Aggregate fields contain additional information beyond the presented data in order to maintain enough state information to calculate the next aggregation. (For example, average requires a count be kept.) A field that carries the aggregate qualifier must be a numeric or duration field and also carry the bound qualifier. Services do not have direct write access to aggregate fields, actions must be used to set the value. |

2.3 Rules

According to an embodiment, the analytic model defines intelligence with rules, which are conditional expressions that are a function of field values. An analytic model may contain many rules and each rule may be associated with one or more actions. When an analytic object is invoked, it evaluates all of its rules and executes all of the actions associated with the rules conditions that evaluate to true.

In accordance with an embodiment of the present invention, each rule expression is assigned a prioritization value which defines the evaluation sequence for the rules and an overall execution sequence for actions. According to another embodiment, rules are put into groups and a user to may select rule priorities which in turn control the sequence in which the rules are evaluated. Rules with a higher prioritization are evaluated before rules with a lower prioritization and the associated actions are performed before the next sets of conditions are evaluated.

Actions associated with separate rules with the same prioritization are assumed to be independent of one another such that action execution sequence is not relevant as long as all the necessary actions execute in some order. If multiple actions are associated with the same rule, those actions will be executed in the sequence defined by the analytic model.

According to an embodiment of the invention, an analytic model may be used only to process rules and return results. In such a rules-only use case, there may be no monitoring or data persistence of any type.

2.4 Timers

According to an embodiment, the meta-analytic model supports the definition of timers. Timers have an associated timer type and duration. A timer type distinguishes timer definitions from one another. The timer duration specifies the period of time that must elapse before an alarm event occurs. An alarm event may be associated with one or more actions such that when the alarm event occurs, all the actions associated with the alarm event execute in the defined sequence. Note that an alarm event does not trigger a rule evaluation/action cycle because alarm events are "hard-wired" to actions. An analytic model may have many associated timer definitions. An analytic object may have many active timers. According to an embodiment of the present invention, an analytic object may have at most one active timer of a given type.

Active timers persist when the server is shut down. According to an embodiment of the present invention, when the server comes back up or restarts, all active timers, regardless the timer is past due during the service down time, or still active after the server down time, are all de-registered, then re-registered. The duration is a continuous running or elapsing of time. If the duration is interrupted by a server shut down, previous duration is no longer valid. An invalid duration makes the corresponding timers invalid.

According to an embodiment, when a server has re-started and is back up (i.e., online and on the network), all previous active timers are re-registered to cancel any invalid timers, and then all previous active timers are re-registered to allow monitored events to come through.

When a user un-deploys a monitor service through package, a warning is raised if there is any active action timer related to the monitor service running, and if the user chooses to un-deploy the monitor service, the related active action timers are terminated, according to an embodiment of the present invention.

When a user pauses a monitor service, a warning should be raised if there is any active action timer related to this monitor service running, if user still choose to pause the package, all active action timers should be persistent and terminated. When the monitor service is resumed, all previously persistent active action timers should be re-registered.

2.5 Actions

According to an embodiment, actions are activities performed by an analytic object when it detects a specified state. Actions may be associated with rules and with timer events. According to an embodiment of the present invention, the analytic meta-model supports the definition of the timer manipulation actions described in table 3.

TABLE 3

Timer Manipulation Actions

| Timer Manipulation Action | Description |
|---|---|
| Start Timer | Starts the specified timer. Begins the countdown to the alarm state for the full timer time. |
| Stop Timer | Stops the specified timer. Stops the countdown to the alarm state for the full timer time |

Timer manipulation actions apply only to timer instances associated with the calling analytic object. Each of the timer manipulation actions is associated with a specific timer type. An analytic model may define many timer types, but since an analytic object can have at most one active timer of a given type, the timer type uniquely identifies a timer instance in an analytic object context.

The meta-model supports the definition of a purge action. A purge action removes the calling analytic object from the data store.

The meta-model supports the definition of an alert action that sends an alert message to a specified channel. The alert action definition includes the definition of an alert message that contains any or all of the fields in the analytic model as well as additional static information.

The meta-model supports the definition of an update action. An update action computes a value and assigns that value to a field. An update action definition specifies the expression that computes an update value and the target field to which that value should be assigned.

The meta-model supports the definition of an aggregation action. The aggregation action definition associates an aggregating operator with a field and optionally a time window.

2.6 Aggregating Operator

According to an embodiment, an aggregating operator effectively operates on a collection of field values to produce a new field value (an aggregate value). These collections are typically obtained a single event at a time and a new calculation is made each time a new value is introduced. The goal is to calculate the aggregation with an O(N) algorithm with N being the event density.

In an analytics environment an analyst may want to apply an aggregating operator to a collection of field values that were generated over a period of time (a time window) to obtain a sum, average, rate, or other aggregate value for the data obtained within the window.

An aggregating operator associated with a fixed window "starts over" when the window duration expires whereas a sliding window moves smoothly over a collection of data adding new values as the arrive and dropping old values as the window moves past them. The rate operator is exceptional in that it uses a sliding window approximation.

While aggregations can be performed over a time window they don't require a time window to be useful. For example, one may want to sum various values in events tied together by some transaction or batch identifier. For the sake of a unified perspective, one could think of the time window as infinite in this case.

3.0 Structural and Operational Embodiments

This section describes a method and system for monitoring, aggregating, and correlating business events in real time and acting on the results with near zero latency according to embodiments of the invention as illustrated in FIGS. 1-7.

Figure 1:
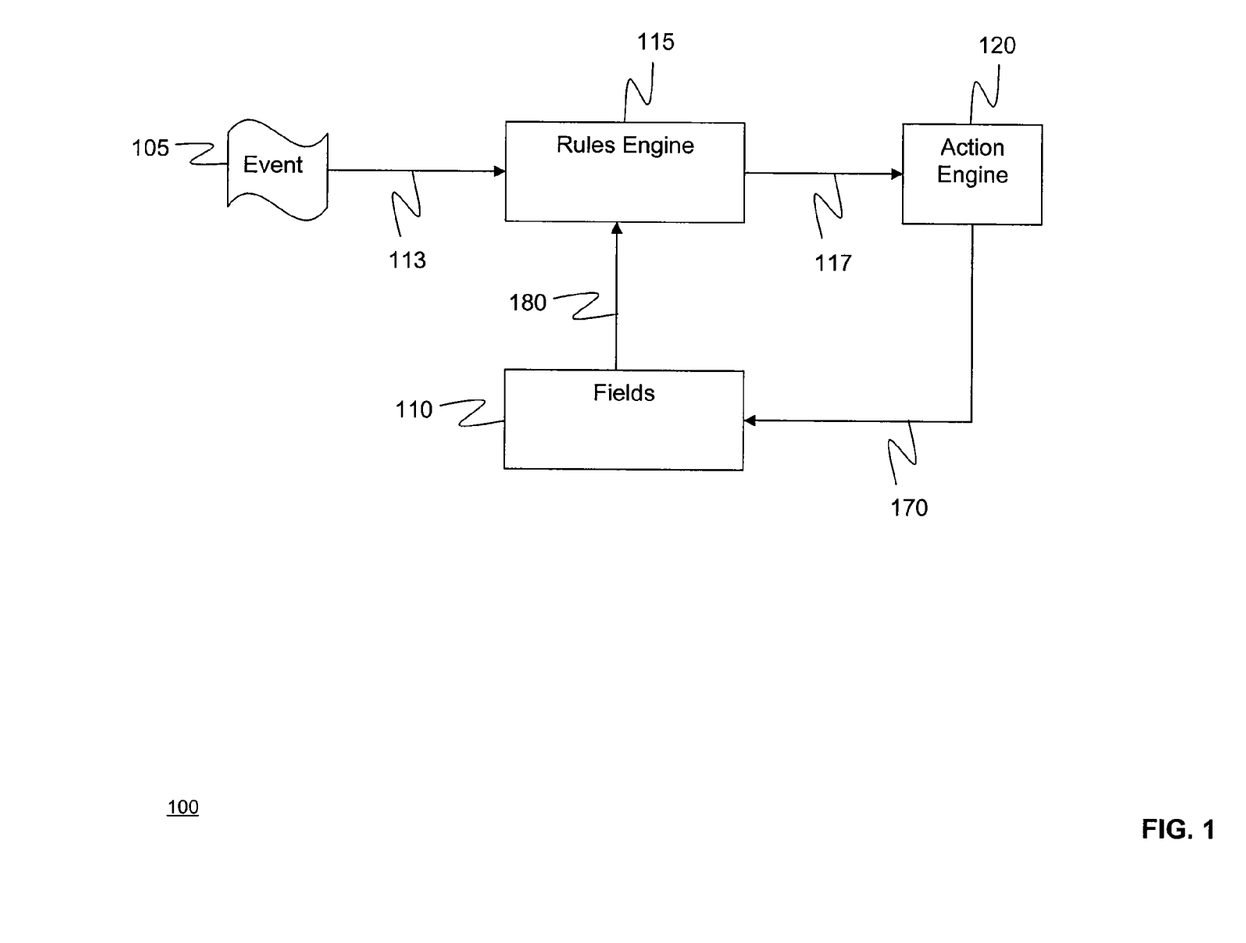
FIG. 1 illustrates event stream processing, according to an embodiment of the invention.

FIG. 1 illustrates business event stream processing 100, according to an embodiment of the invention. 115, 120 and 110 all are part of an analytic model. The States of 110 is the same as fields in FIG. 2 as described below. Event 105 is passed from a monitor service to rule service 115 via protocol 113. Protocol 113 can be any communication protocol. Rule service 115 applies rules to the data contained within event 105. After rules are applied to event 105 data, indicators identifying actions to be performed are passed to action engine 120 via protocol 117. Protocol 117 may be the same or different as protocol 113 and can be any communications protocol. Actions are performed by action engine 120. According to an embodiment of the invention, actions performed by action engine 120 can include one or more of updating data, business data/event aggregation, sending alert emails, executing Java scripts, running SQL queries, timer control, and purging of business data. After actions are performed, any updated data is sent back to monitor service 110 via feedback loop 170. After monitor service 110 determines if business data has changed as a result of actions performed by action engine 120, the changed data 180 is sent to rules engine 115, where the process repeats and invokes a new set of rules to be applied. New business events 105 can be subsequently sent to rules engine 115 as they arise (i.e., new events trigger the business event stream processing).

Other configurations of the business event processing components depicted in FIG. 1 will be apparent to persons skilled in the relevant art(s).

Figure 2:
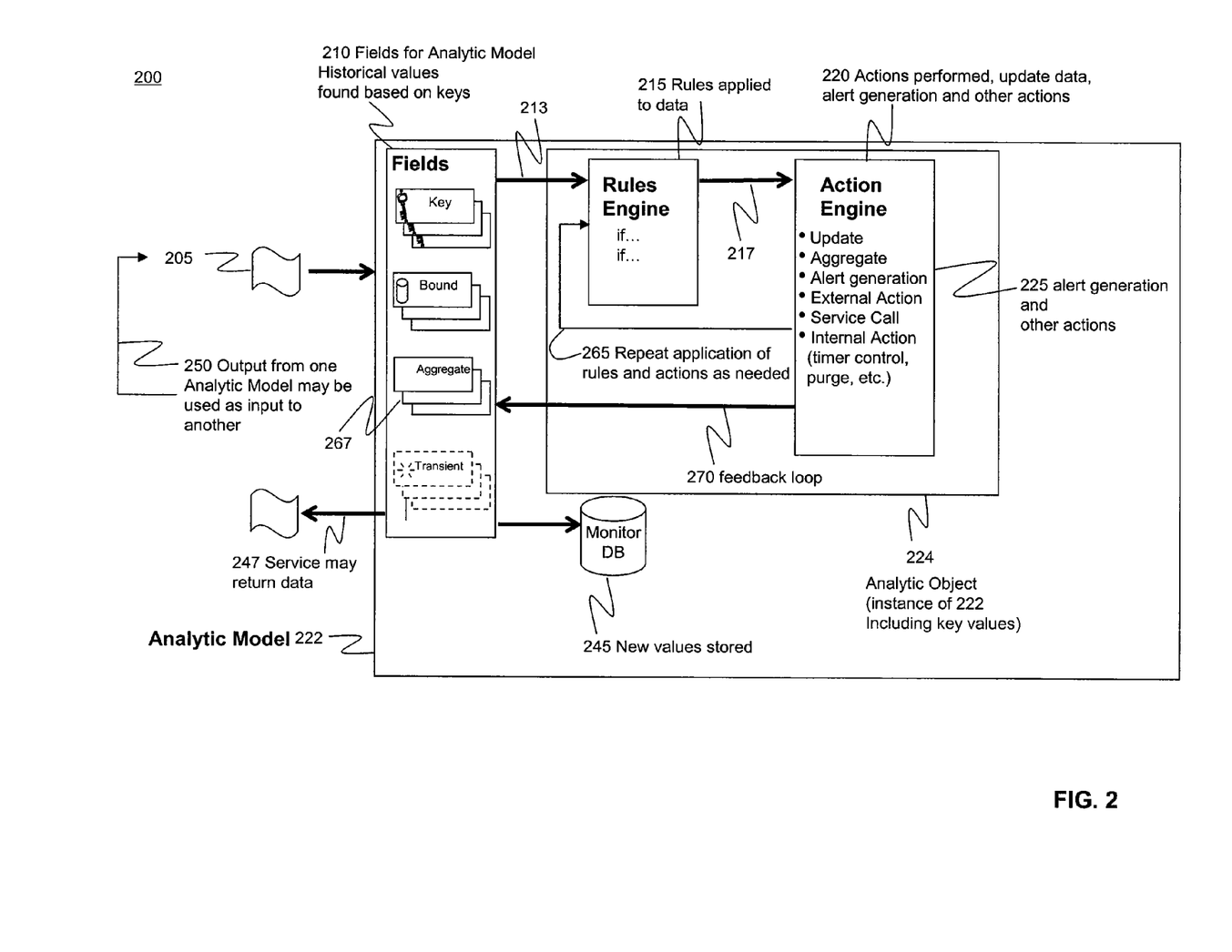
FIG. 2 illustrates an analytic model, according to an embodiment of the invention.

According to an embodiment, operation of the business event processing components depicted in FIG. 1 is depicted in FIG. 2, which shall now be described. FIG. 2 illustrates the interaction 200 between fields 210 in the monitor service and fields in the analytic model 222, according to an embodiment of the invention.

Monitor service 210 can call multiple analytic models, such as analytic model 222. Keys and other fields are passed into analytic model 222 via call(s) 213 with monitor service fields 210.

Rules are applied in rules engine 215 to data passed into analytic model 222. Rules in rules engine 215 are built directly into analytic model 222 to recognize threshold boundaries, itemize key performance indicator ranges, and detect conditions requiring additional actions such as sending alerts 225.

Analytic model 222 defines intelligence with rules in rules engine 215. According to an embodiment of the invention, rules in rules engine 215 are conditional expressions that are a function of field values passed into analytic model 222 via calls 213 from monitor service 210.

Once logical analytic model 222 has been created, model 222 must be bound to a monitor database 245 before it can be useful. According to an embodiment, of the present invention, monitor database 245 can be a physical data store used to store persistent data. According to an embodiment of the invention, an analytic model editor allows users to associate fields in analytic model 222 with columns in the monitor database 245. Analytic models and their associated bindings are accessible through a monitor service.

An analytic model, such as analytic model 222, may contain many rules within rules engine 215 and each rule may be associated with one or more actions 220. When analytic object 224 is invoked, it evaluates all of its rules in rules engine 215 and executes all of the actions 220 associated with the rules conditions that evaluate to true.

According to an embodiment of the invention, each rule expression in rule set in rules engine 215 is assigned a prioritization value which defines the evaluation sequence for the rules in rules engine 215 and an overall execution sequence for actions 220. Rules in rule set within rules engine 215 with a higher prioritization are evaluated before rules with a lower prioritization and the associated actions 220 are performed before the next set of rules in rules engine 215 are evaluated after a repeat application 265 of the rules.

Actions 220 associated with separate rules in rule set within rules engine 215 with the same prioritization are assumed to be independent of one another such that action execution sequence is not relevant as long as all the necessary actions 220 execute in some order. If multiple actions 220 are associated with the same rule in rule set within rules engine 215, those actions will be executed in the sequence defined by analytic model 222.

According to an embodiment of the invention, an alarm event or alert 225 may be associated with one or more actions 220 such that when alert 225 occurs, all actions 220 associated with alert 225 execute in a defined sequence. For example, alert 225 does not trigger a rule evaluation/action cycle 265 because alert events 225 are "hard-wired" specific actions within action set 220.

According to an embodiment of the invention, action group 220 contains an ordered collection of actions. Action group 220 preserves action execution sequence and is re-usable by many rules in rule set within rules engine 215. For example, if two rules in rule set within rules engine 215 select the same action group 220; then action group 220 would only be executed once. This allows rules to be created in an independent fashion without building complicated logic.

Actions within action group 220 are the activities performed by analytic object 224 when it detects a specified state. Actions 220 may be associated with rules within rules engine 215 and with timer events. Analytic model 222 may have many associated timer definitions, according to an embodiment of the invention. Analytic object 224 may have many active timers but at most one active timer of a given type.

Actions within action group 220 may include structure query language (SQL) actions. SQL actions define a SQL command to operate on a database. SQL actions support any SQL compound statement and may place into the statement the value of any defined fields 217 in analytic model 222.

Actions within action group 220 may also include Java Script actions. A Java Script action defines a script that can perform custom actions required by users. Java scripts may access analytic object 224 fields 217 via a provided class and save new data to fields 217 which will be stored in analytic object 224. Access to additionally stored data 270 useful for aggregation by aggregating operator 267 will also be available to the Java scripts.

According to an embodiment of the invention, aggregation action associates an aggregating operator 267 with a field and optionally a time window. Aggregating operator 267 operates on a collection of field values provided to aggregating action via feedback loop 270 to produce a new field value (an aggregate value). These collections are typically obtained a single event at a time and a new calculation is made each time a new value is introduced. The aggregation is calculated with an O(N) algorithm, wherein N is the event density, and wherein aggregation is kept up to date regardless of the number of events coming into the system, in accordance with an embodiment of the invention. According to an embodiment, each calculation is O(1), such that for each event that triggers an aggregation, the time required to aggregate does not depend on the event density.

According to an embodiment of the invention, aggregating operator 267 may be applied by a user to a collection of field values provided via feedback loop 270 that were generated over a period of time (a time window) to obtain a sum, average, rate, or other aggregate value for the feedback loop data 270 obtained within the window.

According to an embodiment of the invention, aggregating operator 267 is associated with a fixed window and "starts over" when the window duration expires. For example, a sliding window moves smoothly over a collection of data provided via feedback loop 270, adding new values as they arrive and dropping old values as the window moves past them. According to another embodiment, a running, self-correcting approximation for sliding windows is used, which maintains O(1) aggregation calculation and approximates the dropping of old values. While aggregations can be performed by aggregating operator 267 over a time window, they do not require a time window to be useful. For example, in an embodiment of the invention, a user may sum various values in events tied together by some transaction or batch identifier. The time window can be infinite, according to this embodiment.

According to an embodiment of the invention, an analytic model such as 222 may be used only to process rules in rules engine 215 and return results 247. For example, there may be no monitoring by monitor service 210 or persistence of any type, with no values stored in monitor database 245.

Analytic model binding specifies the physical data store 245 associated with analytic model 222. Only the fields carrying the bound qualifier in bound analytic model 222 are stored in the defined monitor database 245 at runtime, and the fields that do not carry the bound qualifier are not stored in defined monitor database 245. During binding, the connection information needed to connect to physical data store 245 is defined. For example, this could be a database connection string or a universal resource locator (URL). The physical locations of bound fields within physical data store 245 are also defined during binding. For example, this could include associating a column of a database table with a field from fields 217 in analytic model 222. This binding provides access to any JDBC compliant database. According to an embodiment of the invention, columns in the user defined database table in database 245 are associated with fields 217 in analytic model 222.

Figure 3:
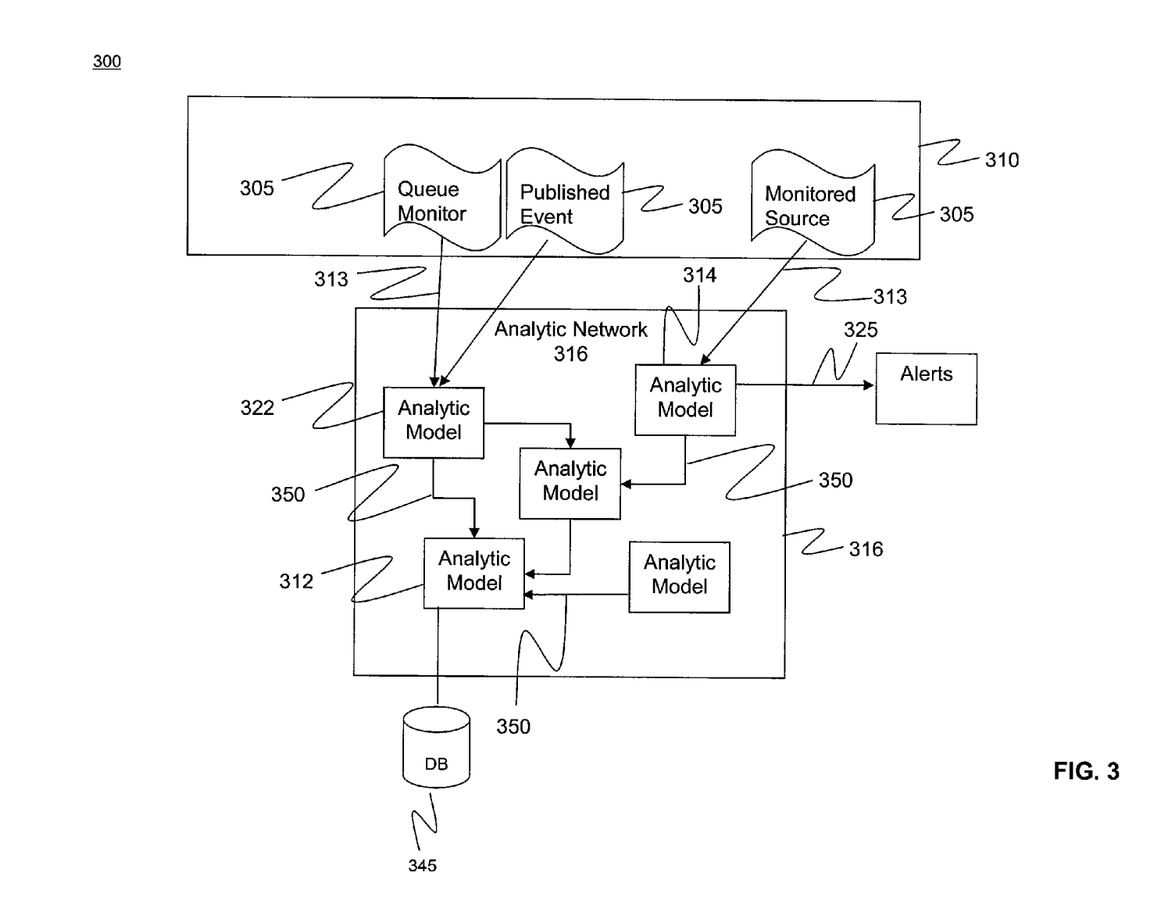
FIG. 3 illustrates the interaction of multiple analytic models to form an analytic network, according to an embodiment of the invention.

FIG. 3 illustrates the interaction via flow relationship 300 of multiple analytic models according to an embodiment of the invention. FIG. 3 depicts how multiple analytic models, such as analytic models 322, 312, and 314, reference each other directly to form an analytic network 316, according to an embodiment of the invention.

Analytic models such as 322, 312, and 314, are of limited use in isolation; they must be brought together into flow relationship 300 to be truly useful. According to an embodiment of the invention, a service editor supports the definition of control flows 350 that join bound analytic models such as 322, 312, and 314 together in a procedural manner. Since a single analytic model such as 322 can be bound to only one data store 345, control flows 350 are essential if the analysis requires rules that depend on data from several data stores.

Analytic control flows 350 are scoped by the service operation in which they are defined. According to an embodiment of the invention, control flows 350 are not re-usable by other operations or outside the service. Bound analytic models such as 322, 312, and 314, do not interact with each other directly;

instead, the interaction is controlled by the service operation. The service operation interacts with a set of bound analytic models as 322, 312, and 314 in a specified order; such that any field in a previous bound analytic model is available as input to the next. Fields may supply data looked up in remote database 345, be a calculated aggregation, or a state determined by rules.

According to an embodiment of the invention, keys and other fields 313 are passed into analytic models 322 and 314 within analytic network 316 by calls from monitor service 310. Keys and fields 313 are passed into analytic models 322 and 314 from monitor service 305 by calls from sources such as queue monitor 305, published event source 305, and monitored source 305.

Analytic models 322, 314, and 312 reference each other directly by passing field sets via control flows 350 to each other, according to an embodiment of the invention. For example, analytic model 322 passes field set 350 to a subsequent analytic model 312.

With continued reference to FIG. 2, applying rules within rules engine 215 to data, analytic model 312 performs actions. In accordance with an embodiment of the invention, analytic model 312 performs actions such as alert generation 325.

Figure 4:
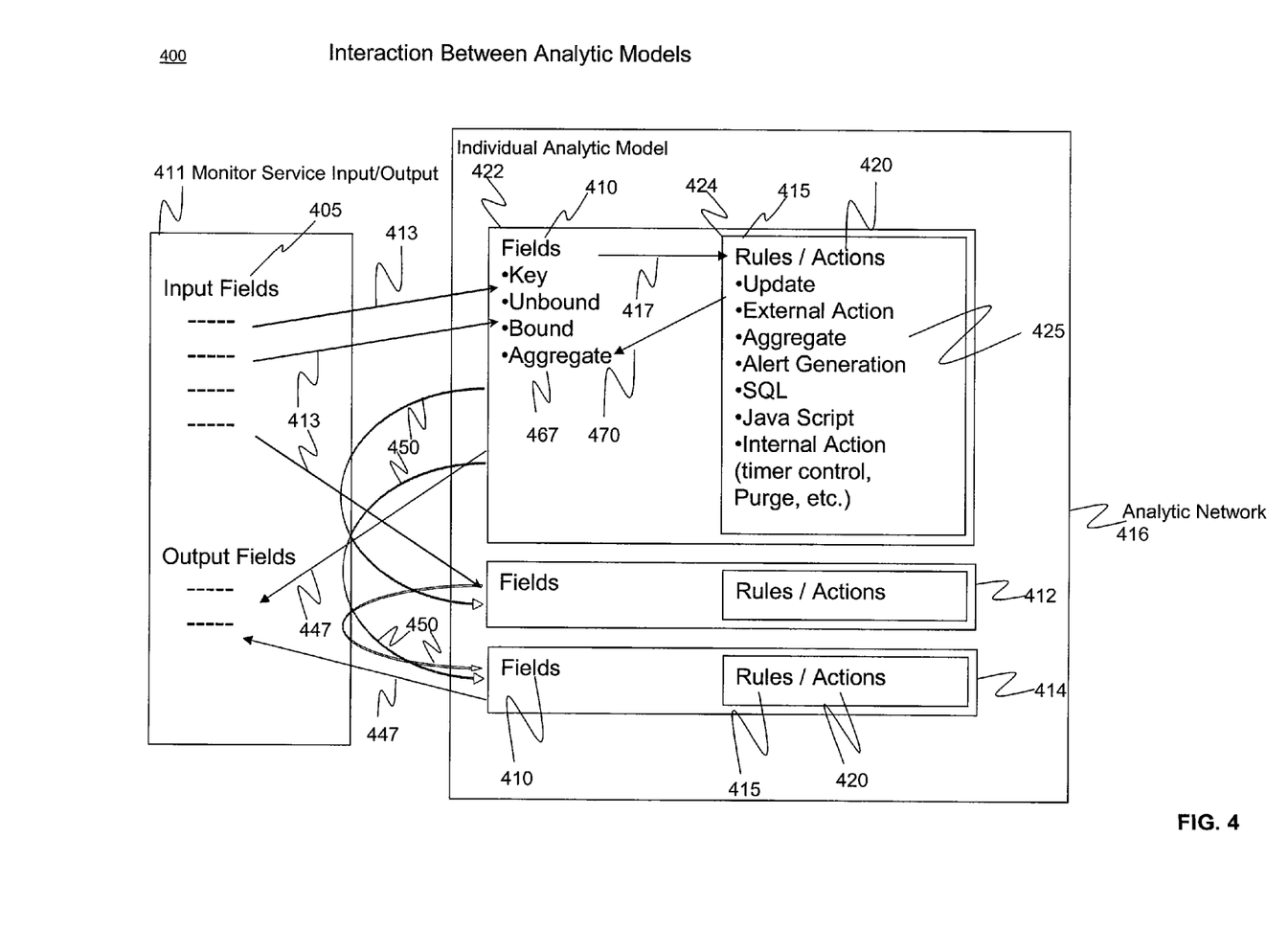
FIG. 4 illustrates interactions between multiple analytic models, according to an embodiment of the invention.

FIG. 4 illustrates interactions 400 between multiple analytic models, according to an embodiment of the invention. According to an embodiment of the invention, monitor service input fields, such as monitor service input/output 411, interact with multiple analytic models, such as analytic models 422, 412, and 414. Monitor service input/output 411 includes input fields 405 to define a specific analytic object instance.

Input fields 405 are passed into analytic models 422 and 412 via service calls 413 from a monitor service. Rules and actions 424 are part of analytic model 422 and are comprised of rules 415 and actions 420. Actions 420 may include activities 425 to be performed pursuant to rules 415.

Within analytic model 422, multiple rules 415 trigger actions 420 that further update analytic model 422 and perform other activities 425. In an embodiment of the invention, other activities 425 may include alert generation. Alerts may be in the form of emails, according to an embodiment of the invention. Any field set 450 from one analytic object such as analytic model 422 is then available to subsequent analytic objects such as analytic models 412 and 414, as determined by the monitor service.

An analytic model such as analytic model 422 is the definition, and an analytic object is an instance of an analytic model. For example, analytic model 422 can be likened to a database table and an analytic object can be thought of as a row the database table. When multiple analytic models, such as 412 and 422, are updated by a single service call 413, they are automatically correlated, maintaining the logical relationship between the analytic objects. Monitor service 410 passes field values 417 to analytic model 422, analytic model 422 looks up the object based on field values 417 and then, a specific analytic object is invoked. Each analytic object instance may be correlated to many instances of several other analytic models.

According to an embodiment of the invention a monitor graphical user interface (GUI) may allow a user to "drill down" from one bound analytic model, such as 422 to all the various corresponding bound analytic models, such as 412 and 414, contained in another analytic model. For example, if analytic model 422 represents service call 413 and analytic model 412 represents aggregated data 470, a user can use the monitor GUI to drill down from an aggregation to view all the events that generated aggregation 467. The Monitor GUI is a web application that provides an interactive, tabular view of all the various bound analytic models, such as 422, 412, and 414. For example the monitor GUI allows a user to drill down into analytic model 422 in various ways such as viewing the attachments associated with model 422 and displaying a list of correlated analytic objects belonging to a different analytic model such as analytic model 412.

According to an embodiment of the invention, the monitor GUI configures colors and icons to analytic objects to aid in visualization. A user may choose a field in a bound analytic model such as 422 and assign colors and icons to various values of fields 410. All data rows with that value are displayed in the chosen color and the icon appears in the chosen field column next to the value itself. This configuration data is stored by user id in a persistent monitor database (such as 245 depicted in FIG. 2 or 345 depicted in FIG. 3). The monitor GUI also provides the interface for all operational controls such as manual purge, and the modification of various system configuration variables.

Service output fields 447 may be returned as a result of any field set 410 from any analytic model, such as 414.

According to an embodiment, field set such as field set 410 is passed from one analytic model to another. For example, the monitor service coordinates providing output 450 from analytic model 422 as input to analytic model 412. Similarly, the monitor service may coordinate tying output 450 from analytic model 412 to input for analytic model 414.

According to an embodiment of the present invention, analytic models 422, 412, and 414 reference each other directly, to form analytic network 416.

Figure 5:
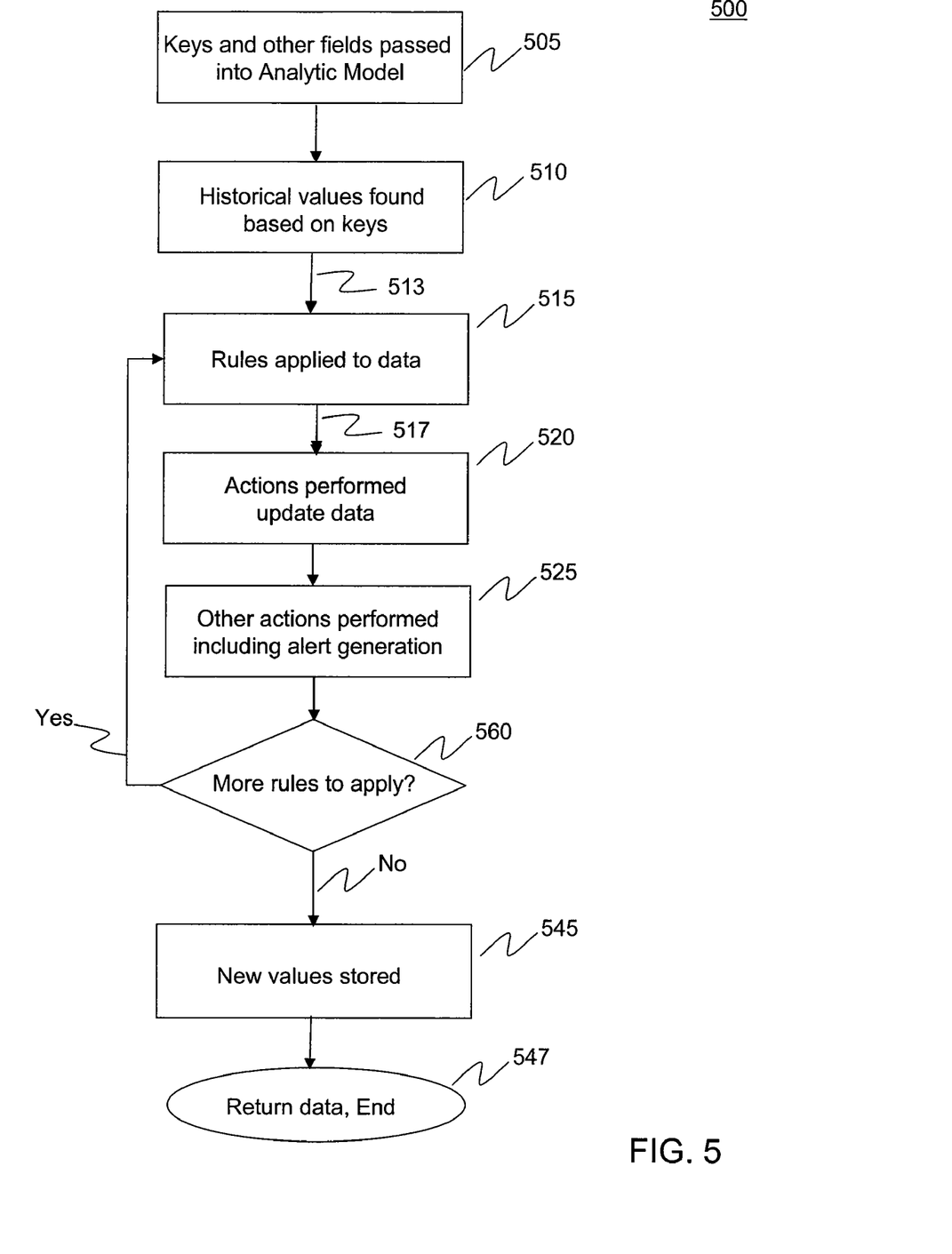
FIGS. 5 and 6 are flowcharts representing methods for near real-time business activity monitoring, according to embodiments of the invention.

FIG. 5 is a flowchart 500 illustrating steps by which near real-time business activity monitoring is performed, in accordance with an embodiment of the present invention.

More particularly, flowchart 500 illustrates the steps by which analytic model receives keys and other fields, applies rules to the data, and performs actions. Flowchart 500 is described with reference to the embodiment of FIG. 2. However, flowchart 500 is not limited to that example embodiment. Note that the steps in the flowchart do not necessarily have to occur in the order shown.

The method begins at step 505 where keys and other field values are passed into the analytic model 222.

In step 510, historical values are found by analytic model 222 based on the keys and other field values, and then values are passed to analytic object 224 via calls 513.

In step 515, rules are applied to data values passed via calls 513. Analytic model 222 contains many rules that are applied in step 515, wherein each rule may be associated with one or more actions to be performed in step 520. When analytic object 224 is invoked, it evaluates all of its rules in step 515 and executes all of the actions in step 520 that are associated with the rule conditions that evaluate to true. In step 515, rules from a rule set within rules engine 215 with a higher prioritization are evaluated before rules with a lower prioritization and the associated actions are performed in step 520 before the next set of rules are evaluated after an application of the next set of rules in a subsequent performance of step 515 via conditional step 560 (described below).

In step 520, actions are performed pursuant to rules applied in step 515. Analytic data fields 517 are also updated in this step. According to an embodiment of the invention, if multiple actions are associated with the same rule in applied in step 515, those actions will be executed in the sequence defined by analytic model 222.

In step 525, other actions are performed, including alert generation. In this step, alerts may be generated in the form of emails, according to an embodiment of the invention.

In step 560, an evaluation is made regarding whether more rules are to be applied, based on the data updated in step 520 and actions performed in step 525.

If it is determined that more rules need to be applied, then control returns to step 515. Accordingly, the process described above involving steps 515, 520, and 525 is repeated until there are no more rules to apply. The reiterations of steps 515, 520, and 525 stop when there are no additional rules remaining to be applied. The same rules are not repeatedly applied, rather rules are applied in the order of their priority, wherein a set of lower-priority rules being applied after higher priority rules have been applied until there no unapplied rules.

If it is determined in step 560 that there are no more rules to apply, then step 545 is performed. In step 545, new values are stored in the monitor database.

If it is determined in step 560 that more rules are to be applied based on updated data performed in step 520, and steps 515-560 are repeated. This process is repeated until there are no more rules to apply.

If it is determined in step 560 that no other rules are to be applied, new values are stored in the monitor database in step 545, and the process ends in step 547.

Figure 6:
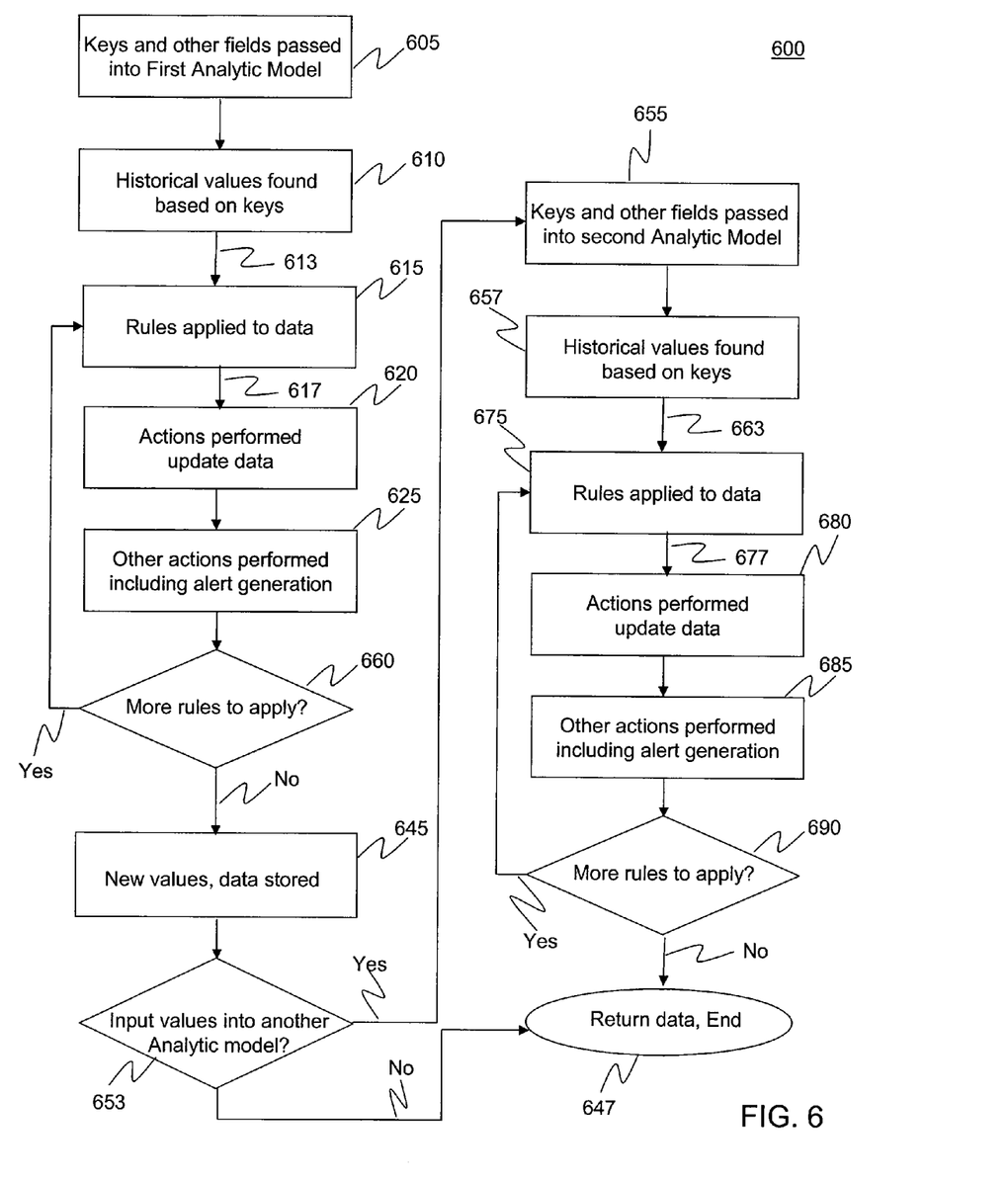

FIG. 6 is a flowchart 600 illustrating steps by which near real-time business activity monitoring is performed, in accordance with an embodiment of the present invention. Although FIG. 6 depicts two analytic models being chained together, more than two analytic models can be chained together, in accordance with an embodiment of the present invention.

More particularly, flowchart 600 illustrates the steps by which an analytic model receives keys and other fields, applies rules to the data, and performs actions and then inputs values into another analytic model. Flowchart 600 is described with reference to the embodiment of FIG. 2. However, flowchart 600 is not limited to that example embodiment. Note that the steps in the flowchart do not necessarily have to occur in the order shown.

The method begins at step 605 where keys and other field values are passed into the analytic model 222.

In step 610, historical values are found by analytic model 222 based on the keys and other field values, and then values are passed to analytic object 224 via calls 613.

In step 615, rules are applied to data values that were passed to analytic model 224 via calls 613 in step 610. Analytic model 222 contains many rules that are applied in step 615, wherein each rule may be associated with one or more actions to be performed in step 620. When analytic object 224 is invoked, it evaluates all of its rules in step 615 and executes all of the actions in step 620 that are associated with the rule conditions that evaluate to true. In step 615, rules in rule set within rules engine 215 with a higher prioritization are evaluated before rules with a lower prioritization and the associated actions are performed in step 620 before the next set of rules are evaluated after a repeat application of the rules in step 675.

In step 620, actions are performed pursuant to rules applied in step 615. Data fields 617 are also updated in this step. According to an embodiment of the invention, if multiple actions are associated with the same rule in applied in step 615, those actions will be executed in the sequence defined by analytic model 222.

In step 625, other actions are performed, including alert generation. In this step, alerts may be generated in the form of emails, according to an embodiment of the invention.

In step 660, an evaluation is made regarding whether more rules are to be applied, based on the data updated in step 620 and actions performed in step 625.

If it is determined that more rules need to be applied, then control returns to step 615. Accordingly, the process described above involving steps 615, 620, and 625 is repeated until there are no more rules to apply.

If it is determined in step 660 that there are no more rules to apply, then step 645 is performed. In step 645, new values are stored in the monitor database in step 645.

In step 653, a determination is made regarding whether the values stored in step 645 are to be input into another analytic model.

If it is determined that values stored in step 645 need to be input into another analytic model, then control is passed to step 655 via call 650. Accordingly, the process described below involving steps 657, 675, 680, and 685 is repeated until there are no more rules to apply.

If it is determined in step 660 that values stored in step 645 do not need to be input into another analytic model, then control is passed to step 647, data is returned, and the process ends.

In step 657, historical values are found by the second analytic model based on the keys and other field values, and the values are passed to analytic object 224.

In step 675, rules are applied to data values 663. The second analytic model contains rules that are applied in step 675, wherein each rule may be associated with one or more actions to be performed in step 680.

When analytic object within the second analytic model is invoked, it evaluates all of its rules in step 675 and executes all of the actions in step 680 that are associated with the rule conditions that evaluate to true. In step 675, rules in the second analytic model's rule set with a higher prioritization are evaluated before rules with a lower prioritization and the associated actions are performed in step 680 before the next set of rules are evaluated after a repeat application of the rules in step 675.

In step 680, actions are performed pursuant to rules applied in step 675. Data 677 is also updated in this step. According to an embodiment of the invention, if multiple actions are associated with the same rule in applied in step 675, those actions will be executed in the sequence defined by the second analytic model.

In step 685, other actions are performed, including alert generation. In this step, alerts may be generated in the form of emails, according to an embodiment of the invention.

In step 690, an evaluation is made regarding whether more rules are to be applied, based on the data updated in step 680 and actions performed in step 685.

If it is determined that more rules need to be applied, then control returns to step 675. Accordingly, the process described above involving steps 675, 680, and 685 is repeated until there are no more rules to apply.

If it is determined in step 690 that there are no more rules to apply, then the new values are returned in step 647, and the process ends.

4. Example Computer Implementation

Figure 7:
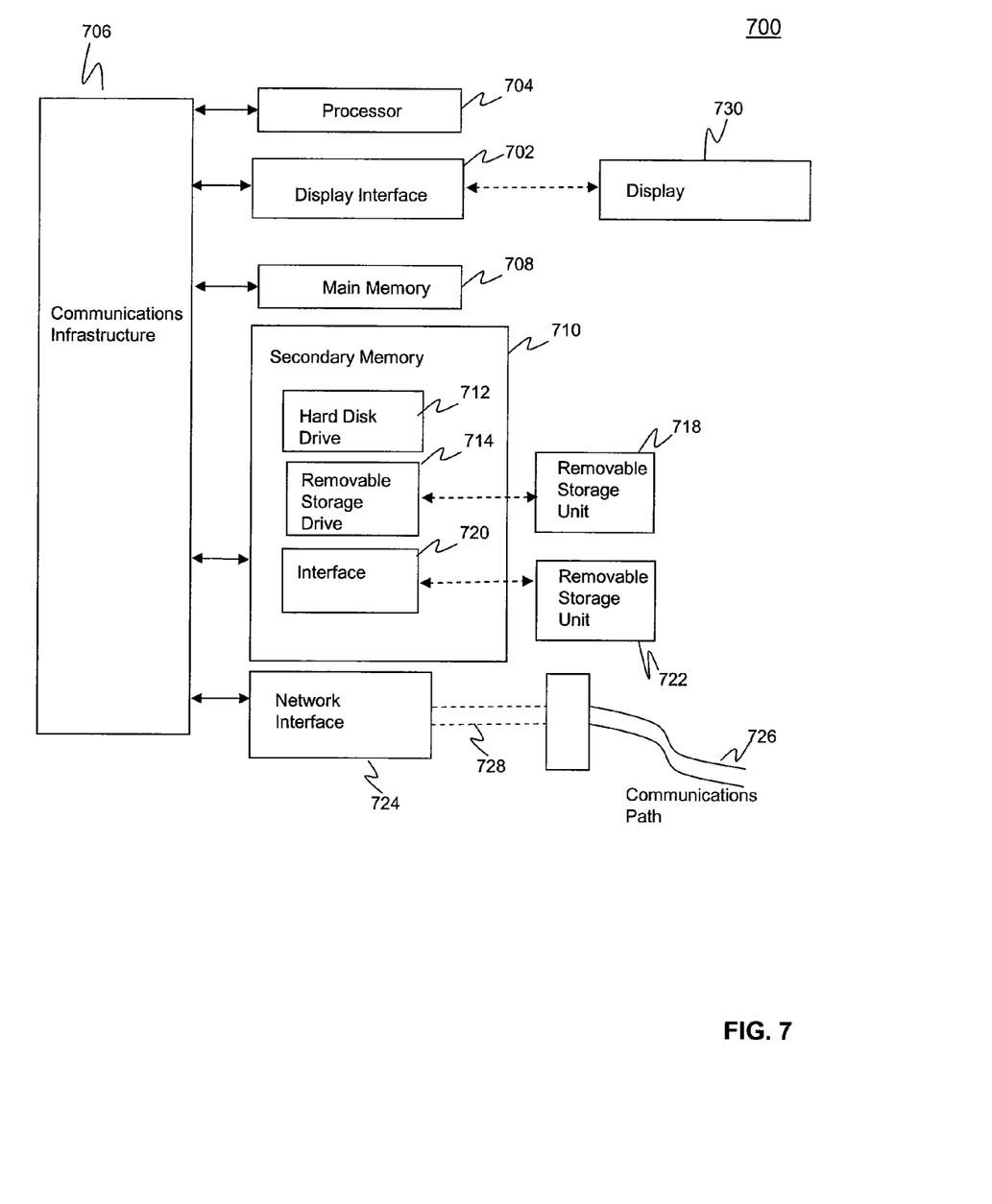
FIG. 7 illustrates an example computer system useful for implementing components of the invention, according to an embodiment of the invention.

In an embodiment of the present invention, the system and components of the present invention described herein are implemented using well known computers, such as a computer 702 shown in FIG. 7. The computer 702 can be any commercially available and well known computer capable of performing the functions described herein, such as computers available from International Business Machines, Apple, Sun, HP, Dell, Compaq, Digital, Cray, etc.

The computer 702 includes one or more processors (also called central processing units, or CPUs), such as a processor 706. The processor 706 is connected to a communication bus 704.

The computer 702 also includes a main or primary memory 708, such as random access memory (RAM). The primary memory 708 has stored therein control logic 728A (computer software), and data.

The computer 702 also includes one or more secondary storage devices 710. The secondary storage devices 710 include, for example, a hard disk drive 712 and/or a removable storage device or drive 714. The removable storage drive 714 represents a floppy disk drive, a magnetic tape drive, a compact disk drive, an optical storage device, tape backup, etc.

The removable storage drive 714 interacts with a removable storage unit 716. The removable storage unit 716 includes a computer useable or readable storage medium 724 having stored therein computer software 728B (control logic) and/or data. Removable storage unit 716 represents a floppy disk, magnetic tape, compact disk, DVD, optical storage disk, memory stick, or any other computer data storage device. The removable storage drive 714 reads from and/or writes to the removable storage unit 716 in a well known manner.

The computer 702 also includes input/output/display devices 722, such as monitors, keyboards, pointing devices, etc.

The computer 702 further includes a communication or network interface 718. The network interface 718 enables the computer 702 to communicate with remote devices. For example, the network interface 718 allows the computer 702 to communicate over communication networks or mediums 724B (representing a form of a computer useable or readable medium), such as LANs, WANs, the Internet, etc. The network interface 718 may interface with remote sites or networks via wired or wireless connections.

Control logic 728C may be transmitted to and from the computer 702 via the communication medium 724B. More particularly, the computer 702 may receive and transmit carrier waves (electromagnetic signals) modulated with control logic 730 via the communication medium 724B.

Any apparatus or manufacture comprising a computer useable or readable medium having control logic (software) stored therein is referred to herein as a computer program product or program storage device. This includes, but is not limited to, the computer 702, the main memory 708, the hard disk 712, and the removable storage unit 716. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

5. Conclusion

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method of monitoring, aggregating, and correlating business events in real time and processing results as implemented on a computer system, wherein event processing is a function of event density, comprising:
   receiving historical values by an analytic model, wherein said historical values are based on a plurality of keys and a plurality of data fields;
   applying a plurality of rules to a plurality of said historical values, wherein each of said rules may be associated with one or more actions to be performed;
   executing actions associated with said rules, wherein the actions include at least updating data and generating alerts;
   determining whether more rules are to be applied;
   repeating the applying, the executing and the determining, when it is determined that more rules need to be applied; and
   storing said, updated data in a monitor database.

2. The method of claim 1, further comprising:
   providing said stored data to a second analytic model.

3. The method of claim 1, wherein said alerts are email messages.

4. The method of claim 1, wherein said alerts are system alarm messages.

5. The method of claim 1, wherein said stored data is provided as input into a plurality of analytic models.

6. The method of claim 5, further comprising:
   interacting with the plurality of analytic models; and
   setting key fields to define specific analytic model object instances.

7. The method of claim 6, wherein updating data in one of said analytic models is available to other analytic models.

8. The method of claim 5, wherein multiple rule calls trigger updating data in one of the said analytic models.

9. A computer system for monitoring, aggregating and correlating business events and processing results, wherein each event is processed in the first order relative to event density, comprising:

a processor; and a memory storing control logic, that when executed by the processor, causes the processor to perform operations comprising:
- (a) receiving historical values at an analytic model, wherein said historical values are based on a plurality of keys and a plurality of data fields;
- (b) applying a plurality of rules to a plurality of data values received by the receiving module, wherein each rule may be associated with one or more actions to be performed, and wherein said rules are evaluated;
- (c) executing actions associated with said rules from the rule application module, wherein the actions include at least updating data;
- (d) determining whether additional rules are to be applied; and
- (e) repeating steps (b)-(d), if it is determined that more rules need to be applied; and
- (f) storing said updated data in a monitor database.

10. The computer system of claim 9, the operations further comprising:
providing said stored data stored to a second analytic model.

11. The computer system of claim 9, wherein the executing generates alerts.

12. The computer system of claim 11, wherein said alerts are email messages.

13. The computer system of claim 11, wherein said alerts are system alarm messages.

14. The computer system of claim 9, wherein said stored data is provided as input into a plurality of analytic models.

15. The computer system of claim 14, the operations further comprising interacting with a plurality of analytic models, wherein said interacting sets key fields to define specific analytic model object instances.

16. The computer system of claim 14, wherein multiple execution of actions associated with said rules trigger actions that update data in said plurality of analytic models.

17. The computer system of claim 15, wherein any field set in one of said analytic model object instances is available to said plurality of analytic models, as determined by the interacting.

18. The computer system of claim 9, the operations further comprising between (d) and (e):
executing actions associated with said rules using said updated data if the determining determines that additional rules need to be applied.

19. A non-transitory computer-readable storage medium having instructions stored thereon that if executed by a processor, causes the processor to perform operations comprising:
- (a) receiving historical values at an analytic model, wherein the historical values are based on a plurality of keys and a plurality of data fields;
- (b) applying a plurality of rules to a plurality of data values received by the receiving module, wherein each rule may be associated with one or more actions to be performed, and wherein the rules are evaluated;
- (c) executing actions associated the plurality of rules from the rule application module, wherein the actions include at least updating data;
- (d) determining whether additional rules are to be applied, wherein the determination is based on the data updated by the action execution module;
- (e) repeating steps (b)-(d), if it is determined that more rules need to be applied; and
- (f) storing said updated data in a monitor database.

20. The non-transitory computer-readable storage medium of claim 19, wherein said operations further comprise:
providing values stored by the database update means into a second analytic model.

21. The non-transitory computer-readable storage medium of claim 19, wherein the operations generate alerts.

22. The non-transitory computer-readable storage medium of claim 21, wherein the alerts are email messages.

23. The non-transitory computer-readable storage medium of claim 21, wherein the alerts are system alarm messages.

24. The non-transitory computer-readable storage medium of claim 19, wherein values stored on the storage device are available as input into a plurality of analytic models.

25. The non-transitory computer-readable storage medium of claim 19, wherein a monitor service interacts with the plurality of analytic models, setting key fields to define specific analytic model instances.

26. The non-transitory computer-readable storage medium of claim 19, the operations further comprising between (d) and (e):
executing actions associated with said rules using said updated data if the determining determines that more rules need to be applied.

* * * * *